United States Patent [19]
Torres et al.

[11] Patent Number: 5,203,759
[45] Date of Patent: Apr. 20, 1993

[54] APPARATUS FOR APPLYING A FIRST TIE TO CASING MATERIAL

[75] Inventors: David O. Torres; Johnny T. Stanley, both of Raleigh; Brian W. Roberts, Apex, all of N.C.

[73] Assignee: Delaware Capital Formation, Inc., Apex, N.C.

[21] Appl. No.: 884,511

[22] Filed: May 15, 1992

[51] Int. Cl.$^5$ ............................................. B31B 1/90
[52] U.S. Cl. .................................. 493/214; 53/567; 53/138.4; 493/308
[58] Field of Search ............... 53/138.3, 138.4, 567; 452/29; 493/194, 195, 196, 214, 215, 288, 308

[56] References Cited

U.S. PATENT DOCUMENTS

| | | | |
|---|---|---|---|
| 2,045,397 | 6/1956 | Maynard | 53/138.4 |
| 2,908,123 | 10/1959 | Muller | 53/567 X |
| 3,261,268 | 7/1966 | Tipper | 493/215 X |
| 3,313,216 | 4/1967 | Piazze | 493/196 |
| 3,334,551 | 8/1967 | Cawley | 493/196 |
| 3,570,375 | 3/1971 | Williams | 493/194 |
| 3,575,339 | 4/1971 | Kupcikevicius | 493/214 X |
| 4,675,945 | 6/1987 | Evans et al. | 17/33 |
| 4,766,713 | 8/1988 | Evans | 53/138 |

*Primary Examiner*—John Sipos
*Attorney, Agent, or Firm*—Allegretti & Wittcoff, Ltd.

[57] ABSTRACT

Apparatus for application of a first tie to a hollow casing material includes a mechanism for cutting incremental units of casing from a reel and for simultaneously punching openings through the casing. Incremental units are then transferred from the cutting apparatus into a clipper for application of a clip about the incremental unit of the casing material.

5 Claims, 2 Drawing Sheets

APPARATUS FOR APPLYING A FIRST TIE TO CASING MATERIAL

BACKGROUND OF THE INVENTION

This invention relates to apparatus for applying a "first tie" to casing material.

In the packaging of various food products, such as hams or the like, it is desirable to utilize a food casing material which acts a skin or container for the food product. Ham and other meats are often packaged in this manner. During the food preparation process the casing material, which is usually in the form of a flattened tube or flattened cylinder of flexible, edible film, is removed from a storage reel. The tubing material is normally in a flattened configuration and for this reason may be wound on a reel. Thus, the flattened tube is removed from the reel and an incremental length of the tube is cut. One end of the incremental length or unit is then gathered and a "first tie" seal or closure is applied, usually in the form of a U-shaped, metal clip that is fastened about the one end of the incremental unit of casing material. The "first tie" operation may also involve the attachment of a loop or string or other support which is retained on the casing by means of the clip which is attached to provide the "first tie". The cutting, gathering and clipping operation is typically a labor intensive operation.

After application of the "first tie", the incremental unit of casing material is typically packaged and transported to a food processing plant. Note the casing is still in a flat condition. Then the casing material (in incremental units) is unpacked and opened. Next, a food product is inserted therein. A "second tie" is then applied at the opposite end of the incremental unit of casing material thereby packaging or enclosing the food product. The food product may then be processed, for example, by smoking, cooking, freezing or otherwise processing.

Food packaging and processing operations often include the manufacturing step of providing first tie units of packaging in the matter described above. Since the first tie operation is extremely labor intensive, there has developed a need to provide a more efficient and mechanized means for providing first tie units of packaging material.

SUMMARY OF THE INVENTION

Briefly, the present invention comprises apparatus for cutting and preparing incremental units of flattened casing and for application of a first tie to the hollow casing material. The casing is typically provided as an elongated flattened casing maintained on a reel. The first tie typically comprises a U-shaped, metal clip which is formed about one end of an incremental unit of gathered casing. The apparatus for effecting this operation includes a support frame with a storage reel associated therewith for supporting a roll of the flattened, cylindrical casing material. A carriage is supported on the frame and defines a generally horizontal flat surface for a receipt of a free end of the casing from the roll of casing on the reel. First and second spaced platens are positioned on the frame over the flat surface. The platens are movable simultaneously toward and away from the flat surface in response to a control mechanism for the apparatus. When moved toward the flat surface, the platens effectively grip or lock the flat casing material against the flat surface.

A casing drive roll is also positioned on the frame intermediate or between the platens and in opposed relation to the carriage surface for engaging and driving the casing intermittently over the surface. The casing drive roll is also controlled or synchronously driven with other component parts of the apparatus. An elongate shear is positioned on the frame also in opposed relation to the carriage surface and intermediate the drive roll and the second platen or the platen which is downstream from direction which the drive roll operates to move casing material. Means are provided for driving the shear as well as the drive roll and platens.

The means for driving the drive roll intermittently operates to thereby advance an incremental length or unit of the casing material over the flat surface when the platens are raised. The drive roll then ceases operation, both platens are simultaneously lowered against the casing material and flat surface to hold the casing material in place. Punches associated with one or both of the platens then operate to punch holes through the casing material to facilitate a subsequent food processing operation. The shear is then operated to cut an incremental length of the casing material.

A casing transfer assembly, which is slidably mounted on the frame, then moves along the surface of the carriage and beneath the second platen to transfer the unit of casing material which has just been cut. The transfer assembly moves transversely from the direction of movement imparted to the casing material by the drive roll and directs the edge of the casing into the throat of a clipper mechanism. There one end of the unit of casing material is gathered and a clip is applied to provide the "first tie". In conjunction with the insertion of the unit of casing material into the throat of the clipper, a loop or handle or other element may be inserted in the clipper throat for attachment to the casing material. By application of the U-shaped clip and optional loop or handle, a first tie assembly is thus produced by the apparatus in the manner described.

Optional features include a perforation roller, which is arranged in the line of movement of the casing material, that includes projecting pins or other projections which lance or otherwise define openings through the casing material. Such openings are desired so that during the food processing operation, for example, when processing a ham product, the casing material can "ventilate". This facilitates the smoking or other food processing steps associated with ham production.

Additionaly, upon lowering of either the first platen or the second platen, a punch descends to make openings through the casing. Such openings are typically desirable adjacent the end of the casing so that when the casing is opened and filled, for example, with a ham product, air within the casing can escape through the punched openings.

Thus, it is an object of the invention to provide an improved, mechanically efficient and effective first tie mechanism for use with tubular casing material.

It is a further object of the invention to provide improved apparatus for application of a U-shaped metal clip about incremental units of casing material that have been cut and otherwise conditioned by the apparatus.

It is a further object of the invention to provide apparatus for manufacture of first tie units of casing material which is highly automated and which can provide such first tie units more economically, more quickly and more efficiently than prior art methodology.

These and other objects, advantages and features of the invention will be set forth in the detailed description which follows.

BRIEF DESCRIPTION OF THE DRAWING

In the detailed description which follows reference will be made to the drawing comprised of the following figures.

DESCRIPTION OF THE PREFERRED EMBODIMENT

Figure 1:
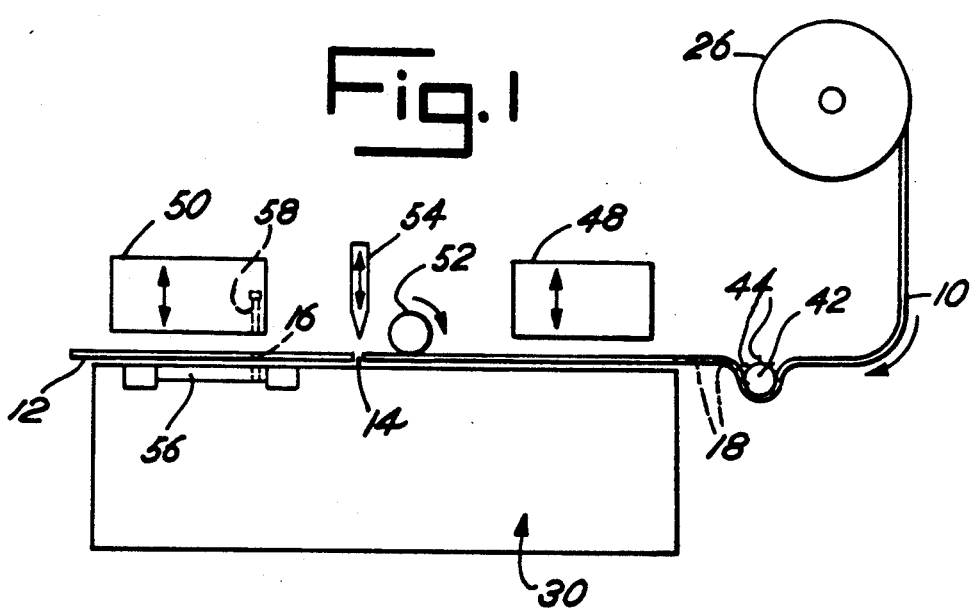
FIG. 1 is a diagram illustrating the manner by which a reel of casing material is processed in accord with the apparatus of the invention to provide an incremental unit of casing.

Referring, first to FIG. 1, there is illustrated a diagrammatic, side view of a length of tubular casing material 10 which is in the form of a folded or flattened ribbon that is wound upon a reel 26. The reel 26 of casing material 10, by operation of the apparatus of the invention, is unwound and an incremental length or unit 12 of the casing material 10 is cut from the end thereof to provide a first tie unit 12. The unit 12 is thus sheared from the ribbon of material 10 along a shear line 14. During the processing operation for the unit 12 by the apparatus, openings 16 are punched through the casing material. Additionally, small perforations or pin openings 18 are optionally provided or defined in the casing material. The openings 16 and perforations 18 are both optional.

Figure 2:
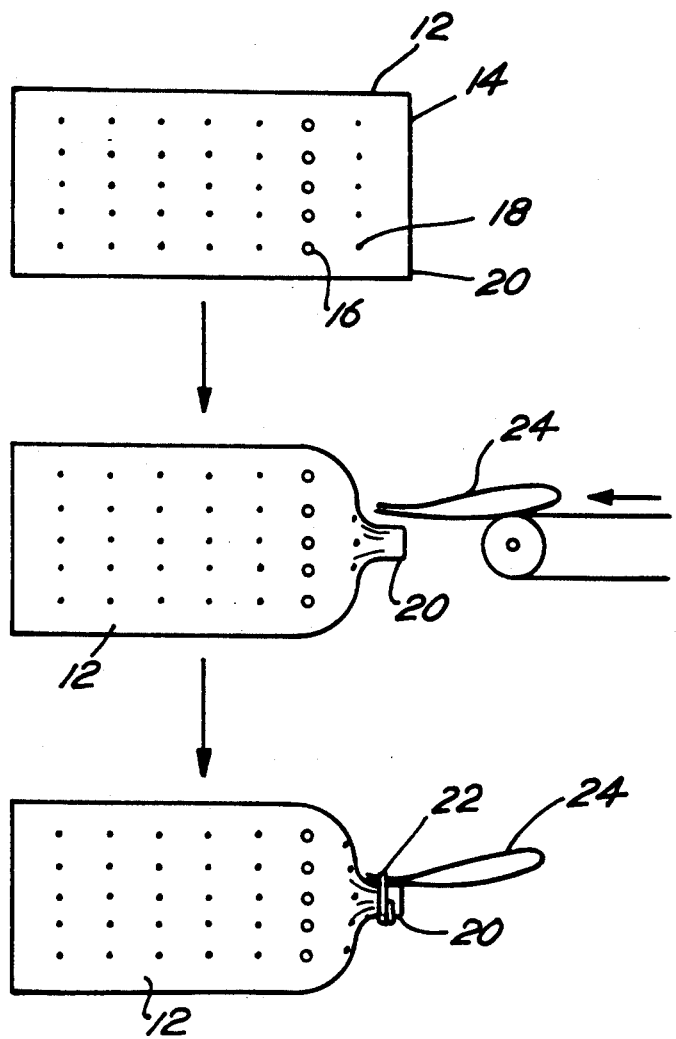
FIG. 2 is a diagram illustrating the subsequent sequential steps of processing of a unit of casing material to apply a "first tie"

Subsequently, as shown in FIG. 2 which is a plan view of the unit 12, the unit 12 is inserted into a clip attachment mechanism where the end 20 of the unit 12 is gathered by the clip mechanism and a U-shaped metal clip 22 is fastened about the end 20. A loop or handle 24 maybe inserted with the gathered end 20 prior to application of the clip 22. Thus, a loop insertion mechanism for insertion of a loop 24 may be utilized in conjunction with a clip attachment mechanism to attach both the loop 24 and seal the gathered material by the clip 22. Resulting first tie units 12 are then typically packaged and sent to a food processing operation for use.

Figure 3:
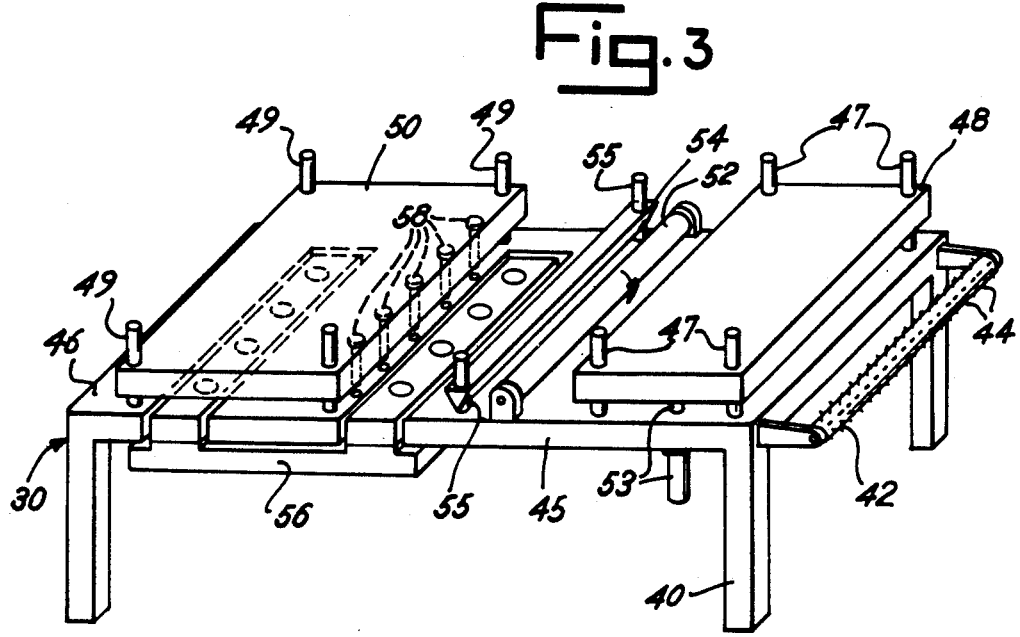
FIG. 3 is a schematic elevation view of the improved apparatus of the invention.
Figure 4:
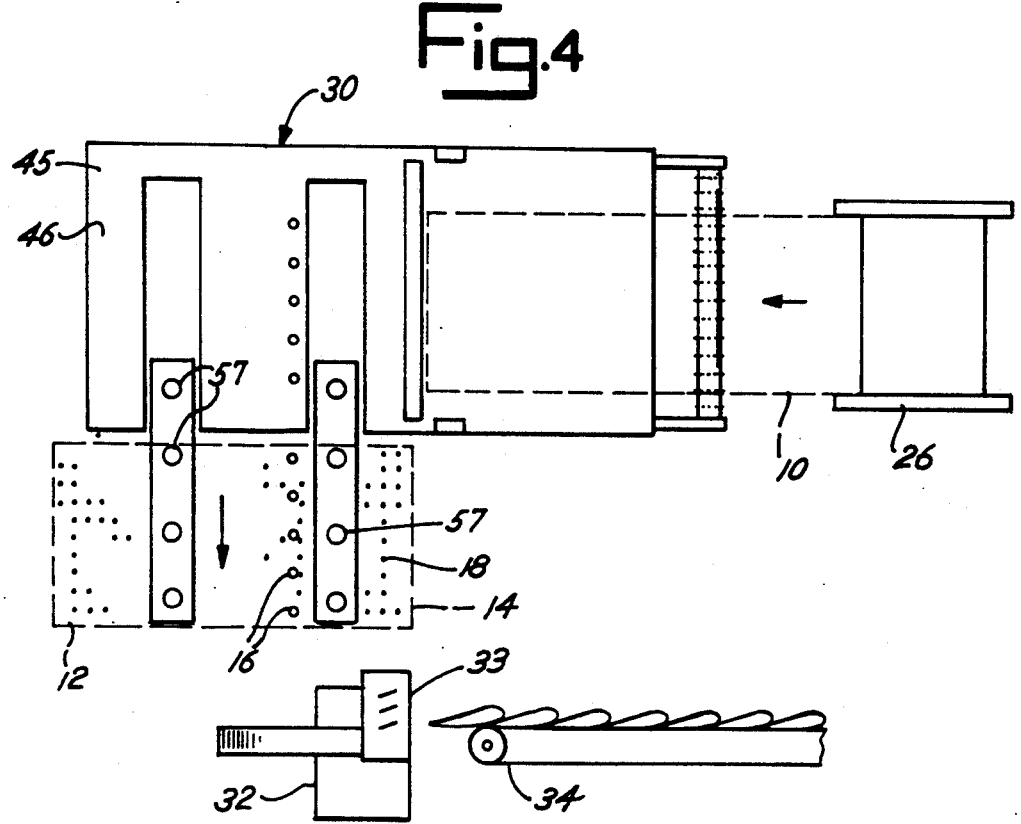
FIG. 4 is a top plan schematic view of the improved apparatus of the invention.

The apparatus for accomplishing the operations just described are depicted more completely in FIGS. 3 and 4. The apparatus includes a device or mechanism for removing the casing end from a roll or reel 26 and for cutting incremental lengths or units 12 of casing to define a unit 12. The unit forming apparatus is generally depicted as apparatus 30. The incremental unit 12 formed by apparatus 30 is then discharged by the apparatus 30 and fed into a clip attachment apparatus or clipper 32. A loop feed mechanism 34 may also be utilized to also feed a loop 24 into the clipper 32. The clipper 32 then attaches a clip 22. A loop feed mechanism 34 which may be utilized in the combination described is depicted in U.S. patent application Ser. No. 07/776,796 filed Oct. 15, 1991. A clipper 32 which applies a clip subsequent to gathering the material and optional insertion of the loop is also described in U.S. patent application Ser. No. 07/776,796 filed Oct. 15, 1991. That application is incorporated herewith by reference.

The apparatus of the present invention relates primarily to the mechanism or apparatus 30 for processing the incremental units or lengths 12 of the casing material alone and in conbination with apparatus of the type depicted in Ser. No. 07/766,796.

Referring further to FIGS. 3 and 4, the apparatus is supported by a frame 40. Positioned and supported on the frame 40 is a perforating roll which 42 which has pins or projections 44. As the casing material 10 is drawn over the roll 42, the casing material 10 is perforated in a desired pattern of perforations 18 by means of the pins 44.

The frame 10 supports a carriage 45 which defines a generally flat surface 46. A first platen 48 is supported on posts 47 on the frame 40 above the carriage 45. A second platen 50 is also supported on posts 49 on frame 40. The platens 48 and 50 are generally spaced above the carriage 45 when the casing 10 is being incrementally advanced along the flat surface 46. Each Platen 48, 50 is movable toward and away from surface 46 by means of a control cylinder 53, for example, for platen 48.

A drive roll 52 is positioned and supported by the frame 40 above the surface 46 and spaced from surface 46 a limited distance for driving contact with the casing 10. The drive roll 52 frictionally engages the casing material 10 and is driven in the direction indicated by the arrow in the figures to advance the casing material 10 along the flat surface 46. A shear knife 54 on posts 55 includes means to move the knife 54 toward and away from the surface 46 and casing material 10. Shear knife 54 is provided to make a transverse cut 14 through the casing material 10 upon downward actuation.

A suction cup transfer mechanism 56 is provided in the carriage 45 flush with the first surface 46 adjacent and beneath the second platen 50. The suction cup transfer mechanism 56 includes vacuum cups 57 designed to grip an incremental unit 12 of casing material 10 and then move the unit 12 transversely from the path of travel of the casing 10 into the throat 33 of clipper 32.

A set of punches 58 is associated with the platen 50 and operates co-jointly with the platen 50 to punch openings 16 through the casing material 10. The openings 16 are defined adjacent the cut effected by the shear knife 54. Punches 58 may also be arranged independent of and operate independently of the platen 50.

In operation, casing material 10 is drawn an incremental distance over the flat surface 46 by drive roll 52 which operates intermittently to thereby advance the incremental unit 12 of casing material 10. Roll 42 provides a desired perforation pattern in the casing material 10 as the casing 10 is advanced. Drive roll 52 is then stopped, and the first and second platens 48 and 50 move toward surface 46 to grip the casing material tightly against the surface 46. The shear knife 54 is then operated to make a cut 14. Simultaneously with positioning the platen 50 against the first surface 46, the punches 58 are actuated to cut the openings 16 in the unit 12 of casing material 10. Thereafter the platens 48 and 50 move away from the first surface 46 to release the unit 12 and the casing material 10. Substantially simultaneously thereafter, the vacuum cups 57 of transfer mechanisms 56 grip the unit 12 and transfer it transversely from the line of travel of the casing 10 into the throat 33 of the clipper 32. The transfer mechanisms 56 then return to their original position shown in FIG. 3.

The operation then is repeated as the drive roll 52 again advances the casing material 10. The platens 48 and 50 operate synchronously or in unison with one another. The entire operation is sequential in the manner described. Sequential operation is effected by means known to those of ordinary skill in the art. Various means may be utilized to effect the appropriate operation and timing of the moving parts to achieve the various steps in the operation. Thus, while there has been set forth a preferred embodiment of the invention, the invention is to be limited only by the following claims and their equivalents.

What is claimed is:

1. Apparatus for application of a first tie to a hollow casing material, said first tie comprising a U-shaped metal clip formed about gathered casing material, said apparatus comprising, in combination:
   (a) a support frame;
   (b) a carriage on the frame defining a generally horizontal flat surface for receipt of a free end of casing from a roll of casing;
   (c) first and second spaced platens positioned on the frame over the flat surface, the platens each movable simultaneously into and out of contact with the flat surface to thereby grip casing or to release casing;
   (d) a casing drive roll on the frame between the platens and in opposed reaction to the carriage surface for engaging and driving the casing intermittently over the flat surface;
   (e) a shear on the frame in opposed relation to the carriage surface intermediate the drive roll and the second platen;
   (f) means on the frame for driving the shear to cut the casing when the casing is not in motion in response to the drive roll;
   (g) means on the frame for intermittently driving an incremental length of the casing over the flat surface beneath the first to the second platen;
   (h) casing punch means in one of the platens for cutting apertures in the casing when the casing is not in motion;
   (i) means adjacent said carriage for gathering the casing and applying a U-shaped metal clip to the gathered casing;
   (j) a casing transfer assembly slidably mounted on the frame and movable transversely to the direction of casing movement through the carriage including means for directing the incremental length of casing into said means for gathering the casing and applying a U-shaped metal clip to the gathered casing, whereby incremental units of the casing are advanced over the flat surface by the driven drive roll, the casing is then secured against the surface, said shear subsequently an incremental length of casing from the roll, and said transfer assembly subsequently positioning the casing incremental unit in a clipper for attachment of a clip.

2. The apparatus of claim 1 including means for perforating the casing as it is advanced over the flat surface.

3. The apparatus of claim 2 wherein the means for perforating comprise a roll having projections for perforating the casing.

4. The apparatus of claim 1 in combination with a clipper for receipt of a casing incremental unit and for attachment of a U-shaped metal clip.

5. The apparatus of claim 1 wherein the casing transfer assembly comprise a vacuum gripping device slidable on the frame and means for actuating the vacuum gripping device when the shear severs an incremental unit of casing from the roll.

* * * * *